United States Patent
Marco et al.

(10) Patent No.: US 9,953,389 B2
(45) Date of Patent: Apr. 24, 2018

(54) SYSTEM FOR PREEMPTIVELY NAVIGATING DRIVERS TO PASSENGERS BASED ON PASSENGER DEVICE ACTIVITY

(71) Applicant: GT Gettaxi Limited, Limassol (CY)

(72) Inventors: Talmon Marco, Tel Aviv (IL); Sunny Marueli, Nes Ziona (IL); Igor Magazinik, Ramat Gan (IL)

(73) Assignee: GT Gettaxi Limited, Limassol (CY)

( * ) Notice: Subject to any disclaimer, the term of this patent is extended or adjusted under 35 U.S.C. 154(b) by 0 days. days.

(21) Appl. No.: 14/982,886

(22) Filed: Dec. 29, 2015

(65) Prior Publication Data

US 2017/0186126 A1 Jun. 29, 2017

(51) Int. Cl.
*G01C 21/34* (2006.01)
*G06Q 50/30* (2012.01)

(52) U.S. Cl.
CPC ......... *G06Q 50/30* (2013.01); *G01C 21/3438* (2013.01)

(58) Field of Classification Search
CPC .................. G06Q 50/30; G01C 21/3438
See application file for complete search history.

(56) References Cited

U.S. PATENT DOCUMENTS

| 2011/0225269 A1* | 9/2011 | Yap ................... G06Q 10/06 709/219 |
| 2015/0262430 A1* | 9/2015 | Farrelly ............. H04L 67/306 705/13 |
| 2016/0034845 A1* | 2/2016 | Hiyama ........ G06Q 10/063114 705/7.15 |
| 2016/0209220 A1* | 7/2016 | Laetz ................ G08G 1/202 |
| 2016/0247247 A1* | 8/2016 | Scicluna ......... G06F 17/3087 |
| 2016/0364657 A1* | 12/2016 | Bryant ............ G06Q 10/02 |
| 2016/0364678 A1* | 12/2016 | Cao ................. G06Q 10/083 |
| 2016/0364823 A1* | 12/2016 | Cao .................. G06Q 50/30 |
| 2016/0364824 A1* | 12/2016 | Bryant ............. G06Q 50/30 |

* cited by examiner

*Primary Examiner* — Jess Whittington
(74) *Attorney, Agent, or Firm* — Lowenstein Sandler LLP

(57) ABSTRACT

In one embodiment information regarding device activity of first subscriber to a transportation service is received. A backend server determines independent of a pending transportation request from the first passenger and based at least on the information regarding the device activity of the first subscriber, to send a driver towards a location based on the location of the first subscriber.

19 Claims, 4 Drawing Sheets

SYSTEM FOR PREEMPTIVELY NAVIGATING DRIVERS TO PASSENGERS BASED ON PASSENGER DEVICE ACTIVITY

TECHNICAL FIELD

This disclosure relates in general to the field of mobile applications and, more particularly, to a system for preemptively navigating drivers to passengers based on passenger device activity.

BACKGROUND

A transportation service may utilize a plurality of drivers that fulfill passenger requests for transportation. A transportation service may provide one or more mobile applications that facilitate the efficient pairing of passengers and drivers. The transportation service may receive a transportation request and select a driver to fulfill the request based on information associated with the transportation request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment information regarding device activity of first subscriber to a transportation service is received. A backend server determines, independent of a pending transportation request from the first passenger and based at least on the information regarding the device activity of the first subscriber, to send a driver towards a location based on the location of the first subscriber.

Example Embodiments

Figure 1:
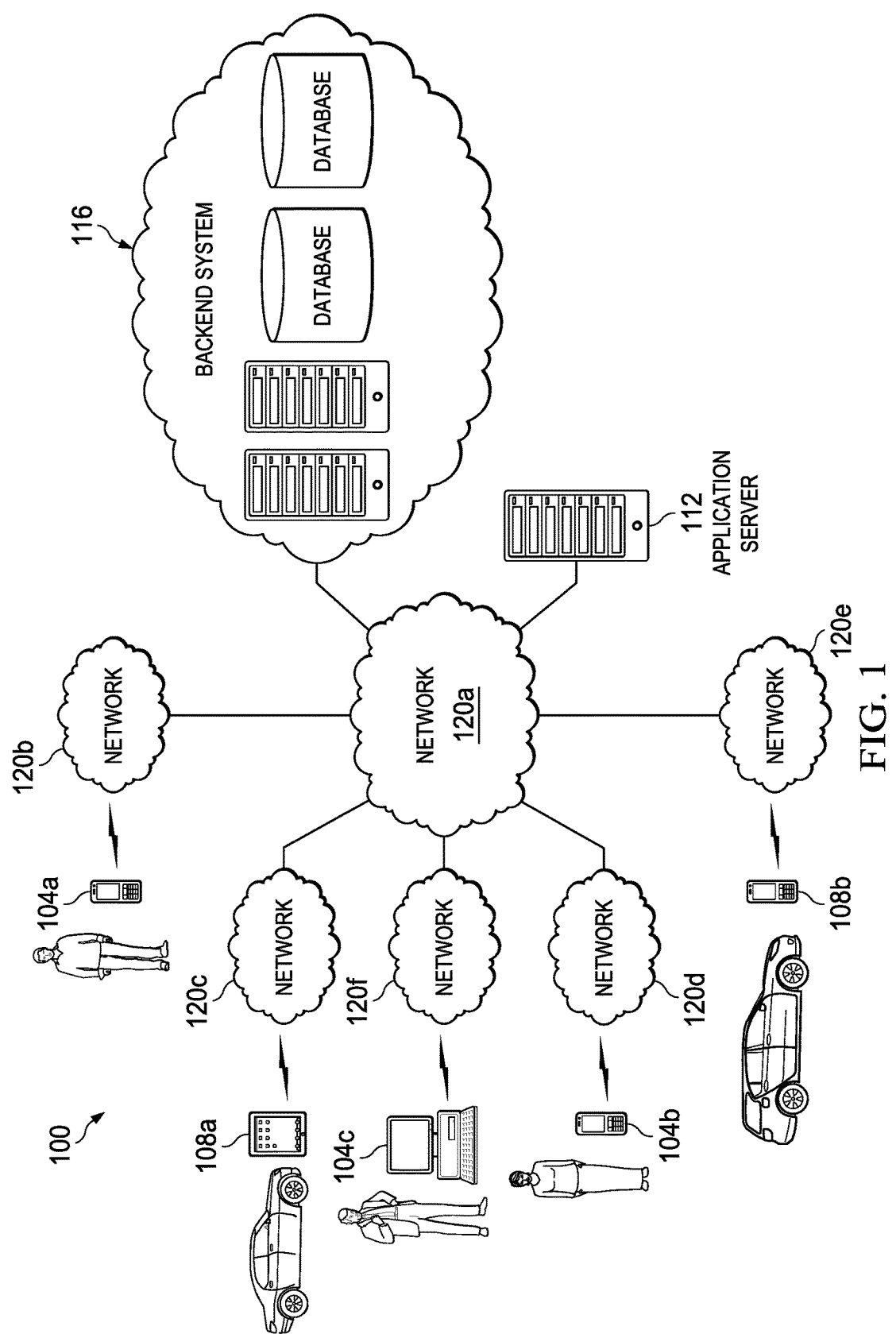
FIG. 1 illustrates a block diagram of a system for preemptively navigating drivers to passengers based on passenger device activity in accordance with certain embodiments.

FIG. 1 illustrates a block diagram of a system 100 for preemptively navigating drivers of a transportation service to passengers of a transportation service based on passenger device activity in accordance with certain embodiments. Although various embodiments may include any number of drivers, passengers, and associated devices, system 100 depicts three passengers having associated passenger computing devices 104 and two drivers having associated driver computing devices 108. The computing devices are coupled through various networks 120 to an application server 112 and a backend system 116.

Various embodiments of the present disclosure may enhance the experience of passengers and drivers associated with a transportation service by preemptively navigating drivers to passengers based on passenger device activity. Particular embodiments may involve sending a driver towards the vicinity of one or more prospective passengers based on previous device activity of the passengers. For example, the activity of the passengers might include previous rides requested by a passenger, an appointment entered in a calendar of a passenger, a search query made by the passenger, an opening of an application that is used to order rides from the transportation service, an email or text message sent or received by the passenger, or other suitable activity. A driver is directed to a location that will allow the driver to quickly pick up a passenger if the passenger submits a transportation request. Various embodiments may provide technical advantages such as minimizing the latency between a transportation request and fulfillment of that request thus reducing the size of a pending transportation request queue that is stored by backend system 116, efficient utilization of drivers, and processing of an increased number of transportation requests.

Computing devices 104 and 108 may include any electronic computing device operable to receive, transmit, process, and store any appropriate data. In various embodiments, computing devices 104 and 108 may be mobile devices or stationary devices. As examples, mobile devices may include laptop computers, tablet computers, smartphones, personal digital assistants, smartwatches, computers integrated with a vehicle, computers integrated with clothing, and other devices capable of connecting (e.g., wirelessly) to one or more networks 120 while stationary devices may include desktop computers, televisions, or other devices that are not easily portable. Devices 104 and 108 may include a set of programs such as operating systems (e.g., Microsoft Windows, Linux, Android, Mac OSX, Apple iOS, UNIX, or similar operating system), applications, plug-ins, applets, virtual machines, machine images, drivers, executable files, and other software-based programs capable of being run, executed, or otherwise used by the respective devices. Each computing device can include at least one graphical display and user interface allowing a user to view and interact with applications and other programs of the computing device. In a particular embodiment, computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (i.e., the devices may be locked down so as not to allow the installation of additional applications or may only allow preapproved applications to be installed).

In various embodiments, a driver computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations driver destination locations, navigational directions, etc.) to the self-driven vehicle. Accordingly, as used herein "driver" may refer to a human being that may physically drive or otherwise control movement of a vehicle or to the vehicle itself (e.g., in the case of a self-driven vehicle) or component thereof (e.g., computing device application 108 or logic thereof).

In particular embodiments, a passenger application runs on passenger computing devices 104. The application may allow a user to enter various account information (e.g., in connection with a registration with the transportation service) to be utilized by a transportation service. For example, the account information may include a user name and password (or other login credentials), contact information of the user (e.g., phone number, home address), payment information (e.g., credit card numbers or bank account numbers and associated information), car preference information (e.g., what models or color of car the user prefers), or other account information.

The application may allow a user to request a ride from the transportation service. In various embodiments, the application may establish a pick-up location automatically or based on user input (e.g., locations may include the current location of the computing device 104 as determined by a global positioning system (GPS) of the computing device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger computing device 104. Any suitable information about the potential driver(s) may be sent to the computing device 104 either before or after the selection of the driver by the passenger, such as a location of a driver, an estimated pick-up time, a type of car used by a driver, the merchandise available in the car, driver ratings or comments from other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on driver computing devices 108. The application may allow a driver to enter various account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected through a deduction that the driver's computing device is not logged in to the transportation service through the driver application), or the driver may be "inactive," meaning that the driver only desires to receive particular requests meeting certain exception criteria specified by the driver.

The application may periodically transmit the current location of the computing device 108 as determined by a GPS of the computing device 108 to the backend system 116. When a driver is selected to provide (or is identified as a suitable candidate for) a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., or other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of a backend system 116. Backend system 116 may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with system 100. As used in this document, the term "computing device," is intended to encompass any suitable processing device. For example, portions of backend system 116 or application server 112 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
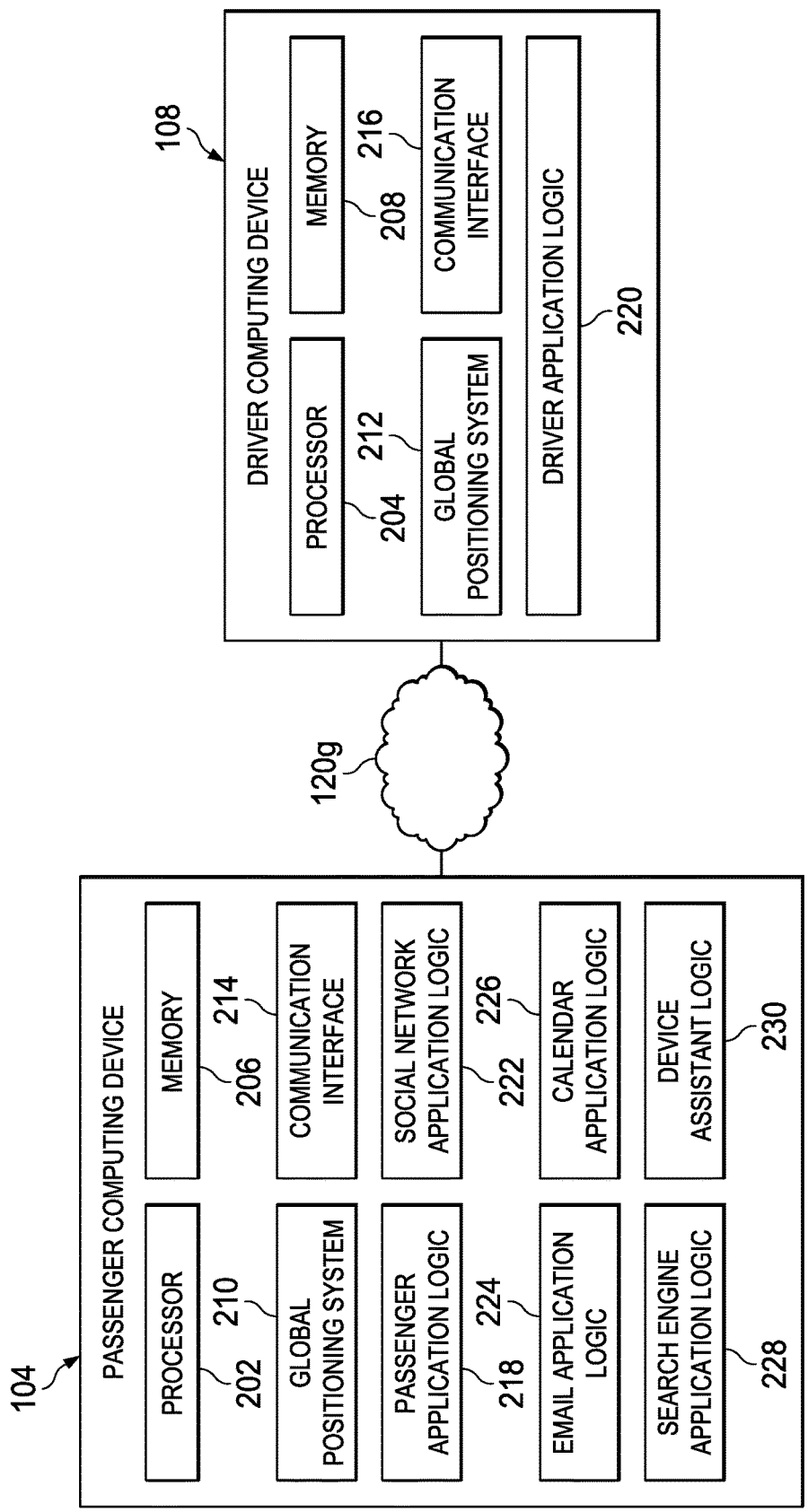
FIG. 2 illustrates a block diagram of a passenger computing device and a driver computing device of the system of FIG. 1 in accordance with certain embodiments.

FIG. 2 illustrates a block diagram of a passenger computing device 104 and a driver computing device 108 of the system of FIG. 1 in accordance with certain embodiments. Herein, "passenger computing device" may be used to refer to a computing device used by a subscriber or other user who interacts with the transportation service (e.g., by communicating with the transportation service to request transportation) while "driver computing device" may be used to refer to a computing device used by a driver of the transportation service. A subscriber may refer to an individual or entity that has provided account data (e.g., user name, password, payment information, telephone number, home address, other account information, or any suitable combination thereof) to backend system 116 for storage by the backend system 116. In the embodiment shown, the devices may be communicatively coupled through network 120g which may include any suitable intermediary nodes, such as a backend system 116.

In the embodiment depicted, computing devices 104 and 108 each include a computer system to facilitate performance of their respective operations. In particular embodiments, a computer system may include a processor, storage, and one or more communication interfaces, among other components. As an example, computing devices 104 and 108 each include one or more processors 202 and 204, memory elements 206 and 208, and communication interfaces 214 and 216, among other hardware and software. These components may work together in order to provide functionality described herein.

A processors 202 or 204 may be a microprocessor, controller, or any other suitable computing device, resource, or combination of hardware, stored software and/or encoded logic operable to provide, either alone or in conjunction with other components of computing devices 104 and 108, the functionality of these computing devices. In particular embodiments, computing devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by computing devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between computing devices 104 and 108 and one or more networks (e.g., 120g) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. In various embodiments, any of the data described herein as being communicated between elements of system 100 may be data generated using voice commands from a user or data generated independently of voice commands (e.g., data may be generated by a processor in response to the processor receiving data from another element or from an input device such as a touch screen). Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Passenger application logic 218 may include logic providing, at least in part, the functionality of the passenger application described herein. Similarly, driver application logic 220 may include logic providing, at least in part, the functionality of the driver application described herein. In a particular embodiment, the logic of devices 104 and 108 may include software that is executed by processor 202 and 204. However, "logic" as used in this Specification, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In a particular embodiment, a user may supply login credentials for a social network system (e.g., FACEBOOK) or other social media system (e.g., TWITTER) to the transportation service through passenger application logic 218. The transportation service (e.g., through backend server) may then access the user's account on the social network system or other social media system and access information associated with the user's account. As another example, passenger application logic 218 may access the user's social media account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In various embodiments, the social network system may interact with passenger application logic 218 or backend system 116 to enhance the functionality of these components. As an example, background information associated with a passenger may be obtained by a backend system 116 and used to determine whether to route a request from the passenger to a particular driver.

In various embodiments, the social network system may provide any of the functionality listed above with respect to passenger application logic 218 in allowing a user to request a ride and may relay received requests for rides to backend system 116 along with any suitable identifying information about the user to facilitate pickup by a driver.

Email application logic 224 may provide an interface for the passenger to read, draft, and/or manage emails. Email application logic 224 may comprise a traditional email client (e.g., Microsoft Outlook or a native iOS or Android mail application) or a web-based email application (e.g., a web browser or other application operable to access Outlook.com, Gmail, Yahoo! Mail, or other web-based email service).

Calendar application logic 226 may provide an interface for the passenger to read, draft, and/or manage calendar appointments and related tasks. Calendar application logic 226 may comprise a traditional calendar client (e.g., Microsoft Outlook or a native iOS or Android calendar application) or a web-based calendar application (e.g., a web browser or other application operable to access Outlook.com, Google Calendar, or other web-based calendar service).

Search engine application logic 228 may provide an interface for the passenger to perform Internet keyword searches. In various embodiments, logic 228 is operable to receive input forming a keyword search. In some embodiments, logic 228 may also perform the keyword search by transmitting the search to one or more servers operable to perform the search and provide search results back to logic 228. In other embodiments, logic 228 may communicate the input to another application to perform the keyword search. In various embodiments, logic 228 may present the search results to the passenger via any suitable interface (e.g., a visual or audio interface). In various embodiments, logic 228 may comprise a web browser or other application.

Device assistant logic 230 may comprise logic to enhance the functionality of other applications of passenger computing device 104. In particular embodiments, device assistant logic 230 may comprise an intelligent personal assistant, such as Siri, Cortana, Google Now, or similar assistant. In various embodiment, device assistant logic 230 may monitor activity of the passenger computing device 104, including an operating system or one or more applications of passenger computing device 104. For example, device assistant logic 230 may access emails, instant messages, or text messages sent by, received by, or accessible by email application logic 224 or other logic of passenger computing device 104. As another example, device assistant logic 224 may access calendar appointments available through calendar application logic 226 (which may be stored in a calendar file stored by passenger computing device 104 or on a remote server). As another example, device assistant logic 224 may access search queries made through search engine application logic 228. As another example, device assistant logic 224 may access transportation requests made through passenger application logic 218 or detect when passenger application logic 218 is opened. As another example, device assistant logic 230 may access the location of passenger computing device 104 using data determined by global positioning system 210.

In various embodiments, device assistant logic 230 may enhance the user experience of the passenger by answering questions from the passenger, making recommendations to the passenger, and performing other actions, such as drafting emails, texts, or calendar appointments. In addition to answering questions explicitly asked by the passenger, device assistant logic 230 may proactively obtain information and present the information to the passenger. In various embodiments, the proactive presentation of information is based upon previous user activity with respect to passenger computing device 104. For example, device assistant logic 230 may present or direct the presentation of (e.g., within a web browser) the status of a flight reservation or other travel reservation that the passenger booked or accessed using a web browser of the passenger computing device 104 or for which a confirmation email was received via email application logic 224. As other examples, device assistant logic 230 may direct the presentation of hotel or restaurant reservations, weather information, sporting event information, package tracking information, local movie times, stock prices, news events, or other information based on the passenger's location, emails, calendar appointments, search or browsing history, or other activity.

Device assistant logic 230 may also use information obtained from the operating system or applications of passenger computing device 104 to enhance the user experience of the passenger with respect to the transportation service. For example, information obtained by the device assistant logic 230 may be used to predict whether the passenger will submit a transportation request to the transportation service and the backend system 116 may proactively send drivers closer to passengers that are likely to submit transportation requests. In various embodiments, device assistant logic 230 may communicate device activity information (which may include at least a subset of the gathered information or other information obtained by processing at least a subset of the gathered information) directly to a server of backend system 116 controlled by the transportation service. In other embodiments, device assistant logic 230 may communicate activity information to a third party server controlled by, for example, the provider of the device assistant logic (e.g., Google, Apple, Microsoft, etc.), which may then communicate the device activity information (or a subset thereof) to a server of backend system 116 controlled by the transportation service. In yet other embodiments, device assistant logic 230 may communicate device activity information with passenger application logic 218 which may then communicate device activity information (or a subset thereof) to the backend system 116.

In particular embodiments, passenger application logic 218 or device assistant logic 230 may send a notification signal to the backend system 116 in response to the passenger opening the passenger application. Such a notification may be used by the backend system 116 to predict that the passenger is about to generate a transportation request and may result in the backend system directing a driver towards the passenger.

In various embodiments of the present disclosure, in addition to any combination of the features described above with respect to the driver application, driver application logic 220 may provide additional features for the driver application to enhance the functionality of the transportation service.

In various embodiments, driver application logic 220 may receive a request from the backend system 116 for the driver to drive towards one or more prospective passengers in anticipation of the backend system 116 receiving a transportation request from a passenger of the one or more prospective passengers (wherein the prospective passengers are selected based on activity information received from their respective computing devices). The driver application logic 220 may present the request to the driver. In various embodiments, logic 220 may allow the driver to indicate whether he accepts or rejects the request to drive towards the one or more prospective passengers and send the indication to backend system 116. Driver application logic 220 may also provide navigational data to the driver to allow the driver to travel towards the one or more prospective passengers to a location specified by the backend system 116.

While the driver is en route to the location specified by the backend system 116 or after the driver has arrived and is waiting at the location, the backend system 116 may receive a transportation request from one of the prospective passengers or another passenger near the location of the driver and send the request to the driver application logic 220 which may present the request to the driver. The backend system 116 or the driver application logic 220 may be configured to automatically accept a transportation request from a prospective passenger on the driver's behalf if the driver is traveling to or waiting at a location based on the prospective passenger's location. In other embodiments, the driver may have the ability to accept or reject the request via driver application logic 220. Driver application logic 220 may also provide navigational data to the driver to allow the driver to travel to the pickup location of the transportation request received from the passenger so that the driver can fulfill the transportation request.

In various embodiments, if a driver is en route to or waiting at a location based on the location of a prospective passenger and the backend system 116 detects that the prospective passenger has opened up (or otherwise activated) the passenger application, the location that the driver is being navigated to may be changed from a location based on the location of the passenger computing device 104 to the actual location of the passenger computing device 104 in anticipation of the passenger submitting the transportation request.

Figure 3:
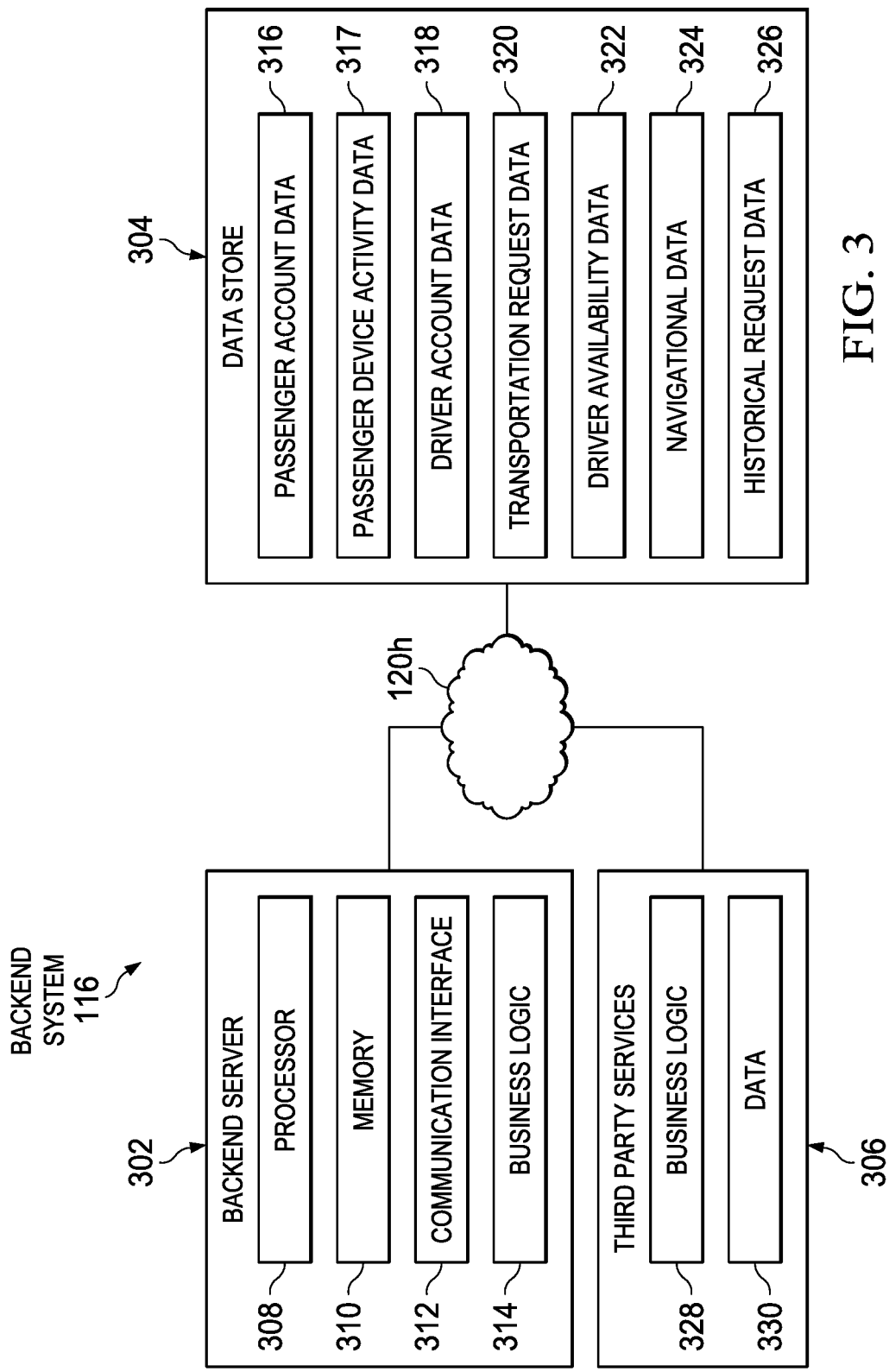
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the transportation service described herein. In the embodiment depicted, backend system includes backend server 302, data store 304, and third party services 306 coupled together by network 120h. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers. In a particular embodiment, backend server 302 and data store 304 are controlled by the transportation service, while third party services 306 are controlled by a third party entity.

In the embodiment depicted, backend server 302 includes a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB). Data store 304 may be located on one or more computing devices that are distinct from backend server 302 or on the same device as at least a portion of backend server 302. Any of the information stored by data store 304 could additionally or alternatively be stored locally in memory 310 temporarily or persistently.

In the embodiment depicted, data store 304 includes passenger account data 316, passenger device activity data 317, driver account data 318, transportation request data 320, driver availability data 322, navigational data 324, and historical request data 326. The various data may be updated at any suitable intervals.

Passenger account data 316 may include any suitable information associated with accounts of subscribers to the transportation service, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

Passenger device activity data 317 may comprise activity information received from passenger computing devices 104 (e.g., via passenger application logic 218, device assistant logic 230, or from a third party service), such as search queries, browsing history, calendar appointments, emails, text messages, instant messages, location data, other activity information, and/or information derived therefrom. Such activity information may include a record of the commute times and locations of the passenger (e.g., as obtained from GPS 210 of the device); flight reservations, train reservations, or other transportation reservations made or used by the passenger; calendar appointments or other written communications (e.g., emails, text messages, instant messages) specifying travel or meetings requiring travel by the passenger; web searches for local points of interest; or other suitable activities. For any suitable activity data, passenger device activity data 317 may also comprise indications of whether particular activity data resulted in the generation of a transportation request and if so, the particular details of the transportation request or a link to the transportation request in historical request data 326 (to be explained in further detail below). In various embodiments, passenger device activity data 317 may also comprise statistics correlating particular activity data of passengers with transportation requests made by the passengers. For example, passenger device activity data 317 may include statistics indicating how likely one or more particular types of activity data are to result in the generation of a transportation request by the passenger. As another example, passenger device activity data 317 may include statistics indicating when the user is most likely to generate a transportation request in connection with one or more particular activities. In some embodiments, passenger device activity data 317 may include a series of likelihoods that the passenger will generate a request as a function of time (e.g., around a time specified by the activity data, such as a flight time or a commute start time).

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby the backend server 302 may assign a transportation request to the driver without waiting for the driver to indicate acceptance of a request), or other suitable information.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the actual pick-up time, the desired destination location of the passenger (which the passenger may or may not provide at the time the request is made), the expected arrival time at the destination location, the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request. In particular embodiments, transportation request data 320 may also store information indicating whether particular requests were received from passengers that had been identified as prospective passengers based on passenger device activity.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of transportation requests, or other suitable information. In particular embodiments, driver availability data 322 may include information indicating whether a driver is travelling towards a location selected based on one or more prospective passengers (e.g., in anticipation of receiving a transportation request from one of the passengers).

Navigational data 324 may comprise information supporting navigation functions provided by the passenger applications and driver passenger applications. For example, navigational data 324 may comprise map data that may be sent to passenger computing devices 104 and driver computing devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the destination location was reached, the total time of the trip, the total fare, a rating given by the passenger to the driver or by the driver to the passenger for the trip, or other suitable information associated with the trip. In particular embodiments, historical request data 326 may include information indicating whether particular requests were received from passengers who had been identified as prospective passengers based on device activity of the passengers.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). In particular embodiments, a third party service 306 may communicate with device assistant logic 230 of various passenger computing devices to receive device activity information and send information to the passenger computing devices 104 to provide information enabling the functionality of device assistant logic 230. In some embodiments, the activity information may be transmitted by the third party service 306 to backend server 302. In various embodiments, the device activity information may be filtered by the third party service 306 before transmission to the backend server 302. For example, third party service 306 may filter out non-relevant information or information that is restricted from being sent by one or more privacy setting preferences of the passenger. Third party service 306 may also process the activity information on the transportation service's behalf before transmitting the processed information to the backend server. For example, third party service 306 might aggregate activity information to determine one or more events associated with the passenger (e.g., a flight or a meeting) and send information associated with the event to backend server 302. Business logic 328 may comprise any suitable logic operable to receive requests for data from backend system 116 and/or computing devices 104 and 108 and provide responses to the requests.

Backend server 302 may be in communication with each passenger computing device 104 and each driver computing device 108 that is utilizing the transportation service at a particular time. Backend server may store information received from the computing devices 104 and 108 in data store 304. Backend server 302 may also receive and respond to requests made by computing devices 104 and 108 by processing information retrieved from data store 304.

When a passenger opens the passenger application, the backend server 302 may log the passenger in based on a comparison of authentication information provided by the passenger computing device 104 with authentication information stored in passenger account data 316. The passenger may then request a ride. The request is received by the backend server 302 and stored in transportation request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his computing device 108. If the driver rejects the request, backend server 302 selects a different driver and the process is repeated until the backend server 302 receives an accepted request from a driver. In another embodiment, backend server 302 may select a plurality of drivers that may fulfill a transportation request and allow the passenger to select one of the drivers. The backend server 302 may proceed to notify the driver of the request in a similar manner to that described above. In yet another embodiment, backend server 302 may select a plurality of drivers that may fulfill a transportation request and notify each driver of the transportation request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the transportation request).

Once the request has been accepted by a driver, the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation information (e.g., the passenger's current location or other pickup location and directions to the current location or other pickup location) to the driver computing device 108 to direct the driver to the passenger's pickup location and subsequently to direct the driver to the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316 and/or driver account data 318 (or information supplied by the passenger at the time of the transaction). The backend server 302 may also receive ratings associated with the trip for the passenger and driver and store these ratings in data store 304.

In various embodiments, backend server 302 receives device activity information from various passenger computing devices 104 and determines whether to classify the corresponding passengers as prospective passengers for a duration of time. The backend server may base the determination of whether to classify a passenger as a prospective passenger based on any suitable device activity information, such as a calendar file comprising one or more appointments of the passenger, one or more emails sent to or composed by the passenger, one or more previous transportation requests made by the passenger, web browser activity, one or more search queries made through a search engine by the passenger, historical location data of the passenger's computing device 104, other device activity information described herein, or other suitable device activity information.

In particular embodiments, backend server 302 may analyze stored device activity information that is related to the received device activity information and determine whether historical transportation requests correspond to the stored device activity information in order to determine the likelihood that the passenger will generate a transportation request in association with the received device activity information. For example, if the received device activity information indicates that the passenger has a flight reservation, backend server 302 may analyze previous flight reservations made or accessed by the passenger and determine whether transportation requests were made in connection with the flight reservations. In particular embodiments, if the calculated likelihood that a passenger will generate a transportation request is above a particular threshold, the passenger will be classified as a prospective passenger.

In some embodiments, the likelihood that a transportation request will be generated in connection with activity information is generated as a function of time. For example, if the activity information indicates that the passenger has a flight scheduled in two hours from an airport 30 minutes away and the stored device activity information indicates the customer has a propensity to arrive at an airport one hour before departure time, the backend server 302 may calculate that the passenger is most likely to generate a transportation request in 30 minutes and is increasingly less likely to generate a transportation request as the amount of time increases in the forward or backward direction from that time. In various embodiments, backend server 302 may produce a quantification of the likelihood a passenger will generate a transportation request for several different points in time. In particular embodiments, the duration of time during which a passenger is identified as a prospective passenger is based on such data points. For example, the passenger may be classified as a prospective passenger during a time period in which each time point is associated with a likelihood of transportation request generation that is above a particular threshold. In other embodiments, the duration that a passenger is classified as a prospective passenger may be determined in other manners, such as selecting a start time and an end time for the duration based on the time at which the passenger is most likely to generate a transportation request (for example by subtracting an amount from the most likely time to determine the start time and adding an amount to the most likely time to determine the end time).

In various embodiments, the most likely time and/or the duration may be selected based on the estimated travel time to a probable destination location determined based on the device activity information. For example, in the scenario described above, it may be determined that a passenger likes to arrive at the airport one hour prior to takeoff. Accordingly, the most likely time might be calculated by subtracting the estimated travel time from the passenger's location to the airport (which may be based on historical and/or current travel information available to the backend server 302 as described above) from the time at which the passenger is estimated to want to arrive. Additionally, in some embodiments, additional time may be subtracted to account for an expected delay between the generation of the transportation request and the arrival of the driver.

Backend server 302 may direct a driver to drive to a location based on the location of one or more prospective passengers. Such a driver may be said to be partially dedicated to the one or more prospective passengers. In some situations, the location to which the driver is directed may be an intermediate point between the driver's current location and a prospective passenger's location. In other situations, the location could be the same location as the prospective passenger's location. In one embodiment, the distance between the location to which the driver is directed and the passenger's location may be inversely related to the likelihood that the prospective passenger will generate a transportation request.

In various embodiments, the location may be based on each of multiple prospective passengers' locations. For example, the location may be equidistant from the locations of the prospective passengers or the location may be weighted towards prospective passengers that have a higher likelihood of generating a transportation request. In various embodiments, backend server 302 may select a group of prospective passengers that are located near each other from a larger set of prospective passengers, and determine a location to which the driver should go based on the locations of the group of prospective passengers.

In particular embodiments, the number of passengers to which a driver is partially dedicated to is based on the likelihood that the particular passenger(s) will generate a transportation request. For example, if a particular passenger is highly likely to generate a transportation request, then a driver may be partially dedicated to that passenger. In another example, a driver may be partially dedicated to a group of prospective passengers once the cumulative likelihood of at least one of the passengers ordering a transportation request is higher than a particular threshold.

In particular embodiments, a driver is partially dedicated to one or more prospective passengers independent of any pending transportation requests from the subscribers. That is, the driver may be sent to drive towards the one or more prospective passengers prior to a new transportation request being received from any of the one or more prospective passengers.

Once a transportation request is received from any of the prospective passengers to which a driver is partially dedicated, the driver may be rerouted to the location of the prospective passenger to pick the passenger up. In various embodiments, the driver may be rerouted to the location of a prospective passenger in response to the backend server 302 receiving a notification that the prospective passenger has opened or otherwise activated the passenger application on his computing device. In particular embodiments, a driver that is partially dedicated to a prospective passenger may be given priority (i.e., selected for a ride) over another potential driver (e.g., that might be selected based on his proximity to the passenger using a standard driver selection algorithm of backend server 302) to reward the driver for accepting the request to drive towards one or more prospective passengers.

In some embodiments, in response to determining that a passenger is a prospective passenger based on the passenger's activity, a message may be sent by backend server 302 (or other computing system of backend system 116) to the passenger's computing device 104. The message may be sent to any suitable logic, such as passenger application logic 218, email application logic 224, or other logic of passenger computing device 104 for presentation to the passenger. The message may include any suitable indication to encourage or assist the passenger to submit a transportation request. For example, the message may include an indication of the proximity (e.g., expressed as an amount of time and/or distance from the location of the passenger computing device 104) of the driver that is en route towards the passenger, a discounted fare offer, a query as to whether the passenger desires a ride, or other suitable information. In particular embodiments, the message may include reply options that allow the passenger to submit a transportation request (from within or outside of the passenger application) or indicate that the passenger does not desire a transportation request. If the passenger replies to the backend server 302 with an indication that the passenger does not desire a transportation request, the driver may be notified of such and/or rerouted to a different location that is not based on the formerly prospective passenger's location. In some embodiments, the message may be sent immediately after a determination that the passenger is a prospective passenger, in response to a driver accepting a request to drive towards a location based on the passenger's location, after a driver has already begun driving towards the location based on the passenger's location, while a driver is waiting at the location based on the passenger's location, or at any other suitable time.

In various embodiments, a prospective passenger may be declassified as a prospective passenger at any suitable time, for example, in response to an explicit notification from the passenger that the passenger does not want to submit a transportation request, after a driver has been waiting at the determined location for a predetermined period of time, when the likelihood that the passenger (or the cumulative likelihood of a plurality of passengers) will submit a transportation request has dropped below a predetermined threshold, or at other suitable times. In response, the driver may be notified of such and/or rerouted to a different location.

Figure 4:
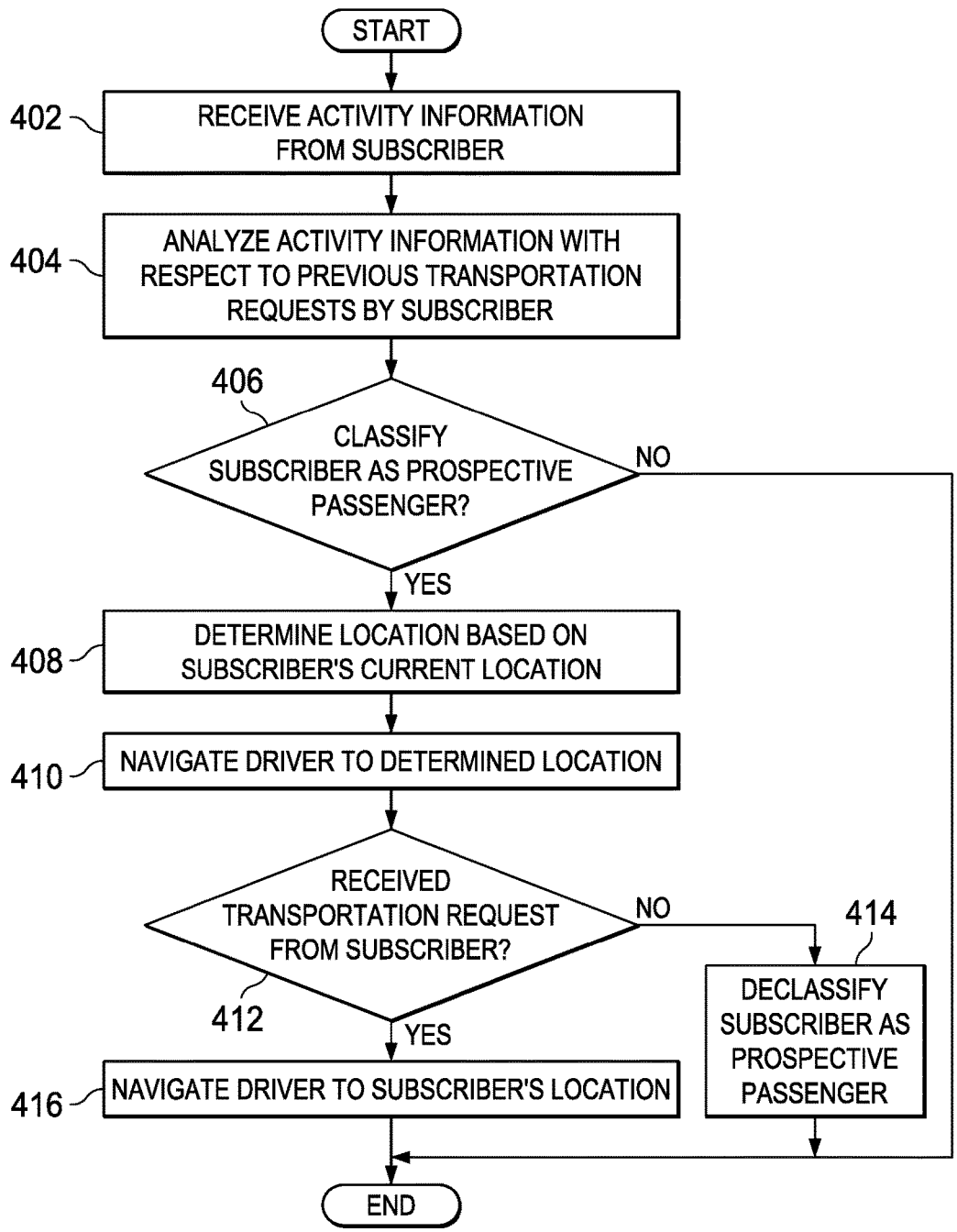
FIG. 4 illustrates a method for preemptively navigating drivers to passengers based on passenger device activity in accordance with certain embodiments.

FIG. 4 illustrates a method 400 for preemptively navigating drivers to passengers based on passenger device activity in accordance with certain embodiments. The steps of FIG. 4 may be performed, for example, by backend server 302.

At step 402, device activity information is received from a subscriber (e.g., via the subscriber's computing device). The device activity information may comprise any suitable information such as described above. At step 404, the device activity information is analyzed with respect to previous transportation requests by subscriber. At step 406, it is determined whether to classify the subscriber as a prospective passenger. This determination may be based on the analysis performed during step 404 and may be based on a likelihood that the subscriber will transmit a transportation request in connection with the device activity information received at step 402. If it is determined to not classify the subscriber as a prospective passenger, the method ends. If it is determined to classify the subscriber as a prospective passenger, then a location based on the subscriber's current location is determined at step 408. The location may be selected so as to allow the driver to move closer to the prospective passenger such that if a transportation request is received from the subscriber, the subscriber's wait time will be reduced. At step 410, the driver is navigated to the determined location.

At step 412, it is determined whether a transportation request has been received from the subscriber. This step may be performed at any suitable time, such as after a driver has been waiting at the location based on the subscriber's current location for a predetermined period of time or at any other suitable time. If a transportation request has not been received from the subscriber, the subscriber is declassified as a prospective passenger at step 414 and the method ends. If a transportation request is received from the subscriber, then the driver is navigated to the subscriber's location at step 416.

Some of the steps illustrated in FIG. 4 may be repeated, combined, modified or deleted where appropriate, and additional steps may also be included. Additionally, steps may be performed in any suitable order or concurrently without departing from the scope of particular embodiments.

It is also important to note that the steps in FIG. 4 illustrate only some of the possible scenarios that may be executed by, or within, the various components of the system described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend server 116, may, in various embodiments, be performed by any combination of one or more passenger computing devices 104 or driver computing devices 108 where appropriate. Similarly, certain functionality described herein as being performed by a passenger computing device 104 or a driver computing device 108 may, in various embodiments, be performed by backend server 116 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
receiving information regarding device activity of a first subscriber to a transportation service and a first subscriber location of a computing device associated with the first subscriber;
determining, by a backend server, independent of a pending transportation request from the first subscriber and based on a likelihood value that the first subscriber is to generate a transportation request, to send a driver towards a first location, wherein a distance between the first location and the first subscriber location is inversely related to the likelihood value, wherein the likelihood value is based on the information regarding the device activity; and
navigating the driver towards the first location.

2. The method of claim 1, further comprising:
in response to receiving the transportation request from the first subscriber, rerouting the driver to the first subscriber location of the first subscriber to pick up the first subscriber to fulfill the transportation request.

3. The method claim 1, further comprising:
while the driver is en route to the first location, receiving the transportation request from a second subscriber to the transportation service; and
in response to receiving the transportation request from the second subscriber, rerouting the driver to a second subscriber location of the second subscriber to pick up the second subscriber to fulfill the transportation request.

4. The method of claim 1, wherein the information regarding the device activity of the first subscriber is obtained from a stored calendar file of the first subscriber to the transportation service.

5. The method of claim 1, wherein the information regarding the device activity of the first subscriber comprises one or more previous transportation requests made by the first subscriber to the transportation service.

6. The method of claim 1, wherein the information regarding the device activity of the first subscriber is based on one or more search queries entered via a search engine on the computing device of the first subscriber to the transportation service.

7. The method of claim 1, wherein the information regarding the device activity of the first subscriber is based on historical location data of the first subscriber to the transportation service.

8. The method of claim 1, wherein the information regarding the device activity of the first subscriber is obtained from an email application of the first subscriber.

9. The method of claim 1, further comprising:
detecting an opening of an application on the computing device of the first subscriber, the application to communicate with the transportation service; and
in response to detecting the opening of the application, rerouting the driver to the first subscriber location of the first subscriber.

10. The method of claim 1, further comprising receiving information regarding device activity of a second subscriber to the transportation service and wherein the first location is selected based further on a second subscriber location of the second subscriber.

11. The method of claim 2, further comprising selecting the driver to service the transportation request from a plurality of drivers available to service the transportation request, wherein the selection includes granting priority to the driver over at least a second driver of the plurality of drivers available to service the transportation request based on the driver having accepted a request to drive towards the first location prior to the backend server receiving the transportation request from the first subscriber.

12. An apparatus comprising:
a memory; and
a processing device communicably coupled to the memory, the processing device to execute instructions to:
receive information regarding device activity of a first subscriber to a transportation service and a first subscriber location of a computing device associated with the first subscriber;
determine, independent of a pending transportation request from the first subscriber and based on a likelihood value that the first subscriber is to generate a transportation request, to send a driver towards a first location, wherein a distance between the first location and the first subscriber location is inversely related to the likelihood value, wherein the likelihood value is based on the information regarding the device activity; and navigate the driver towards the first location.

13. The apparatus of claim 12, the processing device is further to:
in response to receiving the transportation request from the first subscriber reroute the driver to the first subscriber location of the first subscriber to pick up the first subscriber to fulfill the transportation request.

14. The apparatus of claim 12, the processing device is further to:
while the driver is en route to the first location, receive the transportation request from a second subscriber to the transportation service; and
in response to receiving the transportation request from the second subscriber, reroute the driver to a second subscriber location of the second subscriber to pick up the second subscriber to fulfill the transportation request.

15. The apparatus of claim 12, the processing device is further to receive information regarding device activity of a second subscriber to the transportation service and wherein the first location is based further on a second subscriber location of the second subscriber.

16. At least one computer-readable non-transitory media storing one or more instructions which, when executed by a processing device, cause the processing device to:
receive information regarding device activity of first subscriber to a transportation service and a first subscriber location of a computing device associated with the first subscriber,
determine, independent of a pending transportation request from the first subscriber and based on a likelihood value that the first subscriber is to generate a transportation request, to send a driver towards a first location, wherein a distance between the first location and the first subscriber location is inversely related to the likelihood value, wherein the likelihood value is based on the information regarding the device activity; and
navigate the driver towards the first location.

17. The at least one computer-readable non-transitory media of claim 16, wherein the processing device is further to:
in response to receiving the transportation request from the first subscriber reroute the driver to the first subscriber location of the first subscriber to pick up the first subscriber to fulfill the transportation request.

18. The at least one computer-readable non-transitory media of claim 16, wherein the processing device is further to:
while the driver is en route to the first location, receive the transportation request from a second subscriber to the transportation service; and
in response to receiving the transportation request from the second subscriber, reroute the driver to a second subscriber location of the second subscriber to pick up the second subscriber to fulfill the transportation request.

19. The at least one computer-readable non-transitory media of claim 16, wherein the processing device is further to receive information regarding device activity of a second subscriber to the transportation service and wherein the first location is based further on a second subscriber location of the second subscriber.

* * * * *